United States Patent [19]

Smeulers et al.

[11] 4,017,681
[45] Apr. 12, 1977

[54] TELEVISION RECEIVER INCLUDING A BEAM CURRENT LIMITING CIRCUIT

[75] Inventors: Wouter Smeulers; Willem Hendrik Amsen, both of Eindhoven, Netherlands

[73] Assignee: U.S. Philips Corporation, New York, N.Y.

[22] Filed: Aug. 27, 1975

[21] Appl. No.: 608,393

[30] Foreign Application Priority Data

Sept. 9, 1974  Netherlands ............... 7411912

[52] U.S. Cl. ................................ 358/171; 358/243
[51] Int. Cl.² ........................................ H04N 5/68
[58] Field of Search ....... 178/7.3 R, 7.3 DC, 7.5 R, 178/7.5 DC; 358/34

[56] References Cited

UNITED STATES PATENTS 3,598,913  8/1971  Janssen ................. 178/7.5 DC

FOREIGN PATENTS OR APPLICATIONS 920,053  3/1963  United Kingdom ......... 178/7.5 DC

*Primary Examiner*—Robert L. Richardson
*Attorney, Agent, or Firm*—Frank R. Trifari; Henry I. Steckler

[57] ABSTRACT

A circuit measures the beam current of a cathode ray tube and derives a control signal from it to prevent overdriving and defocussing of the CRT. The circuit can measure both peak and average values and has an isolation circuit, such as an emitter follower, to prevent loading of the cathode circuit of the CRT.

7 Claims, 3 Drawing Figures

TELEVISION RECEIVER INCLUDING A BEAM CURRENT LIMITING CIRCUIT

The invention relates to a television receiver having a beam current limiting circuit which includes a converting circuit with a time constant network for converting the current through the cathode of a display tube to a beam current limiting signal, by means of which overdriving of the display tube is avoided, characterized in that the time constant network is connected to the cathode via a separating circuit so that the converting circuit substantially cannot affect the current through the display tube.

U.S. Pat. No. 3,735,029 describes a television receiver of the abovementioned type in which the cathode of the display tube is connected to the mains voltage via a time constant network which is a parallel circuit of a capacitor with a series circuit of a zener diode and a resistor.

When proportioning the high voltage supply the properties of the time constant network in the cathode circuit of the display tube must be taken into account, whilst it is not possible to apply, for example, a peak detection circuit to prevent defocussing due to the occurrence of short-duration peak signals at the display tube.

It is an object of the invention to mitigate these drawbacks.

Hence a television receiver of the aforementioned type according to the invention is characterized in that the time constant network is connected to the cathode via a separating circuit so that the converting circuit substantially cannot affect the current through the display tube.

For example, there may be derived from a small resistor in a cathode circuit of the display tube a voltage which is a measure of the current carried by the cathode circuit concerned. Via a separating circuit, for example an amplifier and matched time constant networks, both information about the mean value of this current and information about any peak values which may occur in it can be derived from this voltage in simple manner, without the cathode circuit being affected. This enables a suitable beam current limiting quantity to be composed.

Embodiments of the invention will be described, by way of example, with reference to the accompanying diagrammatic drawings, in which.

Figure 1:
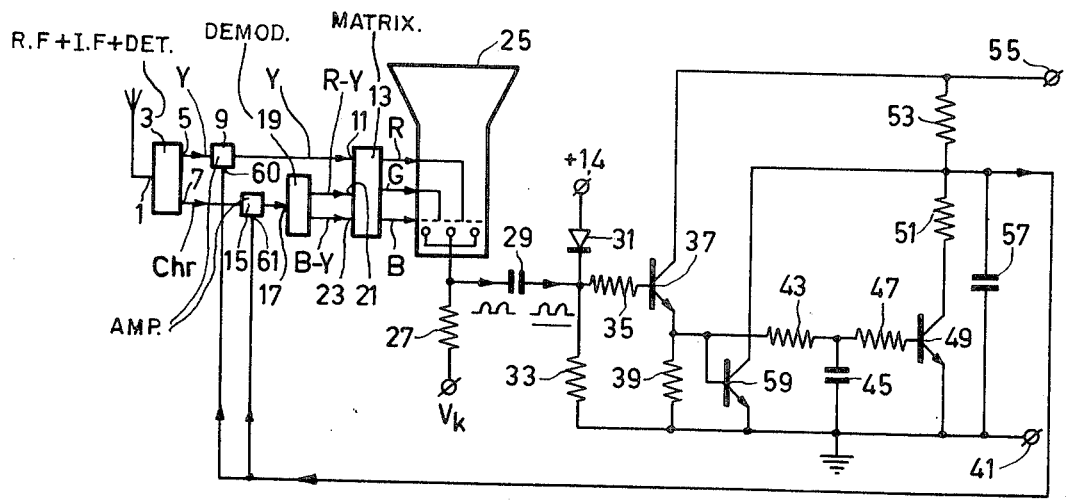
FIG. 1 illustrates a television receiver in which a circuit for generating a beam current limiting voltage is included in the cathode circuit of a display tube according to the invention.

Referring now to FIG. 1, a television signal is supplied to an input 1 of a high-frequency, intermediate-frequency and demodulation section 3 of a television receiver. The section 3 at a first output 5 provides a luminance signal Y and at a second output 7 delivers a chrominance signal CHR. The luminance signal Y is supplied via an amplifier 9 to an input 11 of a matrix circuit 13. The chrominance signal CHR is applied via an amplifier 15 to an input 17 of a demodulating circuit 19 which supplies colour difference signals (R–Y) and (B–Y) to inputs 21 and 23 respectively of the matrix circuit 13. The matrix circuit 13 then delivers colour signals R, G and B which are applied to the control electrodes of a display tube 25.

The cathodes of the display tube 25 are interconnected and through a resistor 27 have a supply voltage $V_k$ applied to them. The resistor 27 can be so small as to cause no appreciable negative feedback.

Across the resistor 27 a voltage is produced which is proportional to the beam current flowing through the display tube 25. This voltage is applied via a capacitor 29 to the junction of the cathode of a diode 31 and a resistor 33. To the anode of the diode 31 is applied a positive voltage such, for example 1.4 volts, that the lowest signal voltages which may appear at the cathode of the diode 31 are clamped at a voltage level of about 0.7 volt. Via a resistor 35 the signal at the cathode of the diode 31 is supplied to the base of a transistor 37 which as a result produces across its emitter resistor 39 a signal voltage the lowest value is about zero volts when the voltage at a supply terminal 41 is zero volts.

The voltage at the emitter of the transistor 37 is applied via a resistor 43 to a capacitor 45 across which a direct voltage is set up which is a measure of the mean value of the cathode current of the display tube 25. Together with the capacitor 45 the resistor 43 forms a time constant network which is isolated, by means of the transistor 37 from the cathode circuit of the display tube and consequently does not affect it. The voltage across the capacitor 45 is applied via a resistor 47 to the base of a transistor 49 which acts as a threshold circuit and passes collector current only if its base voltage is of the order of 0.7 volt. The collector of the transistor 49 is connected to a supply terminal 55 via two resistors 51 and 53. The junction of the resistors 51 and 53 is connected to a capacitor 57 and to the collector of a transistor 59 the base of which is connected to the emitter of the transistor 37.

The transistor 59 acts as a threshold circuit for signal voltages at the emitter of the transistor 37 and passes current only if this signal voltages assumes high values. As a result a voltage which depends upon the amplitude of the said peak signal voltages is set up across the capacitor 57. The transistor 49 produces a further voltage across the capacitor 57 which depends upon the mean value of the current through the display tube so that there is set up across the capacitor 57 a control voltage which depends upon different forms of undesirable overloading of the display tube 25. Also the peak detection circuit with the transistor 49 and the capacitor 57 is isolated from the cathode circuit and cannot affect it.

The voltage across the capacitor 57 serves as beam current limiting quantity and is supplied to control inputs 60 and 61 of the amplifiers 9 and 15 respectively, enabling the contrast and the saturation of the displayed picture to be corrected. Obviously a brightness correction may, if desired, be effected by means of the control voltage obtained across the capacitor 57.

Thus the circuit in the cathode circuit of the display tube acts as a converting circuit by which the cathode current of the display tube is converted into a beam current limiting quantity.

To the cathode resistor 27 of the display tube 25 a direct voltage $V_k$ is applied. As an alternative, a driving voltage may be applied to this cathode resistor. In this case a difference voltage measuring circuit must be connected across the resistor 27 to enable the voltage across the resistor 27 to be measured.

When a diode is so connected between the cathode resistor 27 and the supply voltage $V_k$ as to have its pass direction from the resistor 27 to the supply voltage $K_k$, the input of a measuring device for measuring the black value of the beam current can be connected across the diode. This measuring device may deliver a control signal by means of which the said black value is maintained constant. In the following embodiments other possibilities of measuring the black value of the beam current are shown.

Figure 2:
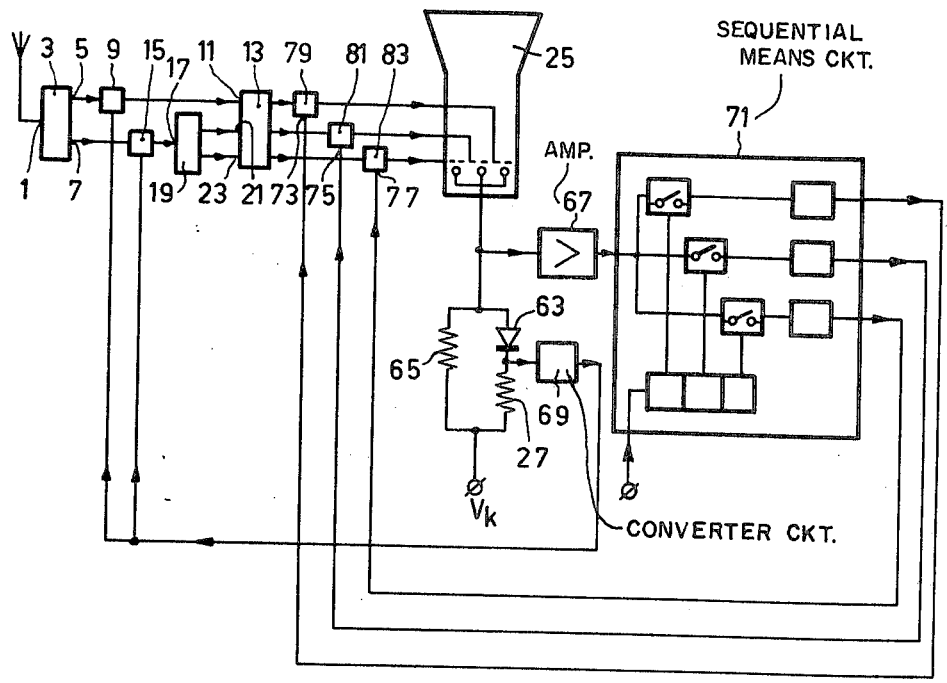
FIG. 2 illustrates a television receiver as shown in FIG. 1, representing the manner in which a clamping circuit which controls a beam current reference level can also be connected to the cathodes of the display tube.

FIG. 2 shows how not only a circuit for obtaining a beam current limiting quantity but also a control circuit for obtaining a constant black value of the beam currents of the display tube which can be included in the cathode circuit of this tube.

Corresponding component parts of the circuit are designated by the same reference numerals as in FIG. 1.

The interconnected cathodes of the display tube 25 here are connected to the resistor 27 via a diode 63, the series combination of the resistor 27 and the diode 63 being shunted by a resistor 65. The value of the resistor 65 is much higher than that of the resistor 27, being, for example, 100 kΩ and 330 Ω respectively. For very small cathode voltages the diode 63 is nonconductive so that substantially only the large resistor 65 is operative in the cathode circuit. The said small cathode voltages are important with respect to the measurement of the black level and are applied to the input of an amplifier 67.

Larger cathode currents cause, via the diode 63, the small resistor 27 to become operative so that the voltage at the cathodes of the display tube is limited and a beam current limiting quantity is derived from the resistor 27 via a converting circuit 69, which may be of the construction as shown in FIG. 1.

The amplifier 67 supplies a signal to a sequential measuring circuit 71 which during, for example, three line periods in each field blanking period sequantially measures the black values in the beam currents at the different cathodes of the display tube and converts them into control voltages which are applied to level control inputs 73, 75, 77 of colour signal amplifiers 79, 81, 83 respectively.

In this circuit all the information about the beam currents of the display tube both with respect to beam current limiting and to level control is derived from the cathode circuit of the display tube substantially without affecting this cathode circuit which permits simple proportioning and independent and reliable operation of these and other circuits.

Figure 3:
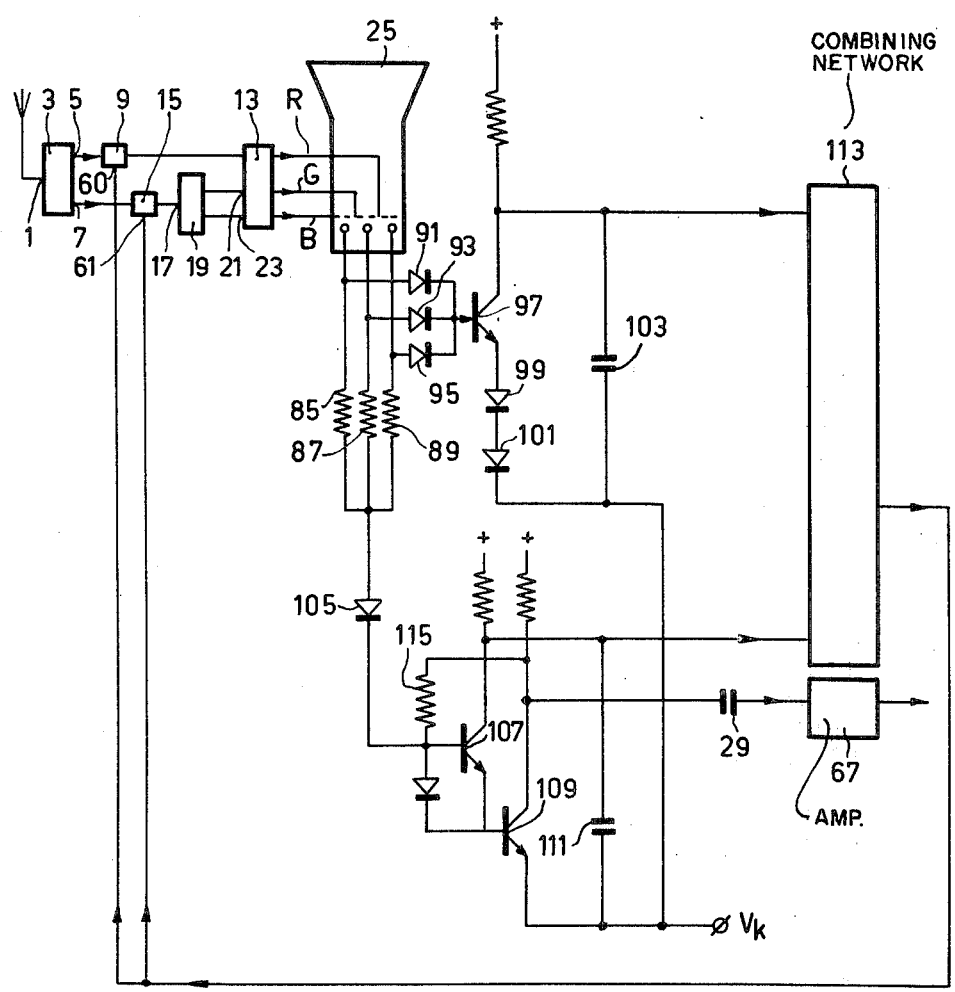
FIG. 3 shows another embodiment of a television receiver provided with a circuit for generating a beam current limiting quantity according to the invention.

FIG. 3, in which corresponding parts are designated by the same reference numerals as in FIG. 1 and 2, shows a method of preventing defocussing of each individual beam. Each of the cathodes of the display tube 25 is connected to a resistor 85, 87, 89, respectively and to the anode of a diode 91, 93, 95 respectively. The cathodes of the diodes 91, 93, 95 are connected to the input of a threshold circuit in the form of a transistor 97 the emitter of which is connected via a series combination of two diodes 99 and 101 to the voltage $V_k$. Consequently the transistor 97 passes current only if the voltage at one of the cathodes of the display tube 25 exceeds a given threshold value, in the present case about 2.8 volts. The collector current of the transistor 97 and hence the direct voltage across a capacitor 103 included in its collector circuit are a measure of a peak currents which occur at the three cathodes. By means of this circuit the peak value of each of the cathode currents is measured so that defocussing of each beam is avoided.

The overall cathode current is further supplied from the junction of the three resistors 85, 87, 89 via a diode 105 to the base of a transistor 107 which is connected as a current amplifier and the emitter of which is connected to the base of a transistor 109. The collector circuit of the transistor 107 includes a capacitor 111 across which a direct voltage is produced which is a measure of the mean value of the joint cathode currents.

The voltages across the capacitors 103 and 111 are combined in a combining circuit 113 which, in its simplest form may be a resistor network to form a desired beam current control voltage or current.

From the collector circuit of the transistor 109 a signal is obtained by means of which the black level in the beam current can be measured. Between the collector of the transistor 109 and the base of the transistor 107 a resistor 115 is connected which has a large value and in the case of small beam current values of the display tube 25 determines the gain of the transistor 109.

If desired, the resistors 85, 87, 89 may be variable to enable the influence of differences in the characteristics of the display tube 25 to be eliminated.

In the embodiments shown, amplifier circuits were used as separating circuit, it is also possible to connect the time constant network, for example via a large resistor, to the cathode and to use a d.c. voltage amplification of a signal which is formed at the time constant network.

What is claimed is:

1. A beam current limiting circuit for a cathode ray display tube having at least one cathode, said circuit comprising an isolation circuit having a high impedance input means for coupling to said cathode and an output, and time constant circuit means for generating a beam current limiting signal in accordance with the cathode beam current having an input coupled to said isolation circuit output and an output means for providing said beam current limiting signal.

2. A circuit as claimed in claim 1 wherein said isolation circuit comprises an amplifier.

3. A circuit as claimed in claim 1, wherein the display tube has a plurality of interconnected cathodes, said beam current limiting circuit further comprising a parallel combination of a first resistor and a series circuit including a diode and a second resistor, said parallel combination being adapted to be coupled to a supply source, the junction of the diode and the second resistor being coupled to the isolation circuit input means, and a control circuit means for maintaining a reference level in the cathode current constant having an input means for coupling to said cathodes.

4. A circuit as claimed in claim 1, wherein the display tube has a plurality of interconnected cathodes, and further comprising a resistor coupled between said cathodes and a supply source, a capacitor coupled said cathodes, and a circuit means for recovering a direct-current component coupled between said capacitor and the input means of said isolation circuit.

5. A circuit as claimed in claim 1, wherein the display tube has a plurality of cathodes, and further comprising a plurality of resistors respectively coupled between said cathodes and the input means of said isolation circuit, a threshold circuit, a plurality of diodes coupled between said cathodes respectively and an input of said threshold circuit, the isolation circuit including a circuit means for obtaining a voltage which is a measure of the mean value of the overall cathode current and the threshold circuit including a circuit means for obtaining a voltage which is a measure of the peak values in each of the cathode currents.

6. A circuit as claimed in claim 1, further comprising a resistor and a diode coupled between said cathode and a source of a supply voltage, a measuring device means for measuring the black level in the beam current having an input coupled across the diode, and the resistor and the diode being coupled to the input means of the isolation circuit.

7. A circuit as claimed in claim 1, wherein said tube has a plurality of control electrodes, and further comprising a radio frequency, intermediate frequency, and detector section having luminance and chrominance signal outputs; first and second amplifiers each having signal inputs coupled to said outputs respectively, gain control inputs coupled to said time constant circuit output means, and outputs; a demodulator coupled to said second amplifier output; and a matrix circuit having inputs coupled to said first amplifier output and said demodulator, and a plurality of output means for coupling to said control electrodes respectively.

* * * * *